Aug. 16, 1938.   J. W. CULBERTSON   2,126,741
SHOCK DISSIPATING SPEAR
Filed Oct. 23, 1936

INVENTOR
JOE W. CULBERTSON
BY Edwin D. Jones.
ATTORNEY

Patented Aug. 16, 1938

2,126,741

UNITED STATES PATENT OFFICE 2,126,741

SHOCK DISSIPATING SPEAR

Joe W. Culbertson, West Hollywood, Calif., assignor to Technical Oil Tool Corporation, Ltd., a corporation of California Application October 23, 1936, Serial No. 107,216

8 Claims. (Cl. 33—205)

My invention relates to drift recording apparatus for oil wells of the character embodied in my co-pending application, Serial No. 31,935, wherein a drift recording instrument is supported in a housing, the opposite ends of which are closed by plugs connected threadedly to the housing and the lower one of which carries a spear. In the descent of the apparatus into a drill pipe the spear successively strikes the tool joints and finally the drill bit stem, and the resultant shocks are transmitted to the threaded connections between the housing and plug to so distort the connections as to allow water, oil and mud to leak into the housing. In deep wells the pressure of the liquid is so extremely high that when once admitted to the housing it causes the recording instrument to become inoperative through collapse of the tube in which the instrument is contained.

It is a purpose of my present invention to provide a spear which is constructed and so associated with the apparatus housing as to effectively dissipate the shocks to which it is subjected in their transmission to the housing and to thereby maintain the threaded connections intact to preserve their functions of sealing the housing against the admission of water, oil or mud.

I will describe only one form of shock dissipating spear embodying my invention and in association with a drift recording apparatus, and will then point out the novel features thereof in claims.

Figure 1:
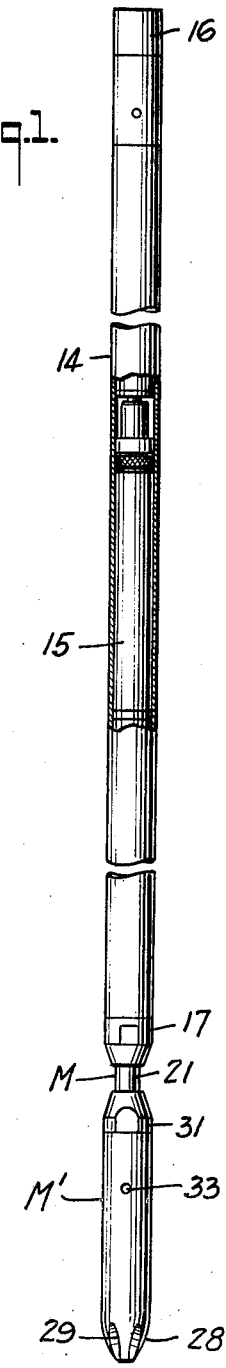
Fig. 1 is a view showing in side elevation and partly in section a drift recording apparatus having applied thereto one form of shock dissipating spear embodying my invention.

In Fig. 1 I have shown only those parts of a drift recording apparatus for well holes as are necessary to a clear understanding of the application and functioning of my shock dissipating spear. The apparatus includes an elongated tubular housing 14 carrying therein a container 15 for a drift recording instrument of the type disclosed in my co-pending application hereinbefore referred to. This housing is closed and normally sealed top and bottom against the admission of fluid, by plugs 16 and 17, respectively, threaded as at 18 in the housing. As the lower plug 17 is the only plug structurally concerned with my invention, it is the only one illustrated in Fig. 2, although the upper plug has a functional relationship with my invention as will later be described.

The shock dissipating spear embodying my invention comprises a fixed member M secured to the plug 17, and a movable member M' telescoped on the fixed member, with resilient means including a non-metallic element 19 and a metallic member 20, for dissipating the shocks resultant of the spear striking the tool joints and drill bit stem in their transmission to the threaded joint 18.

Figure 2:
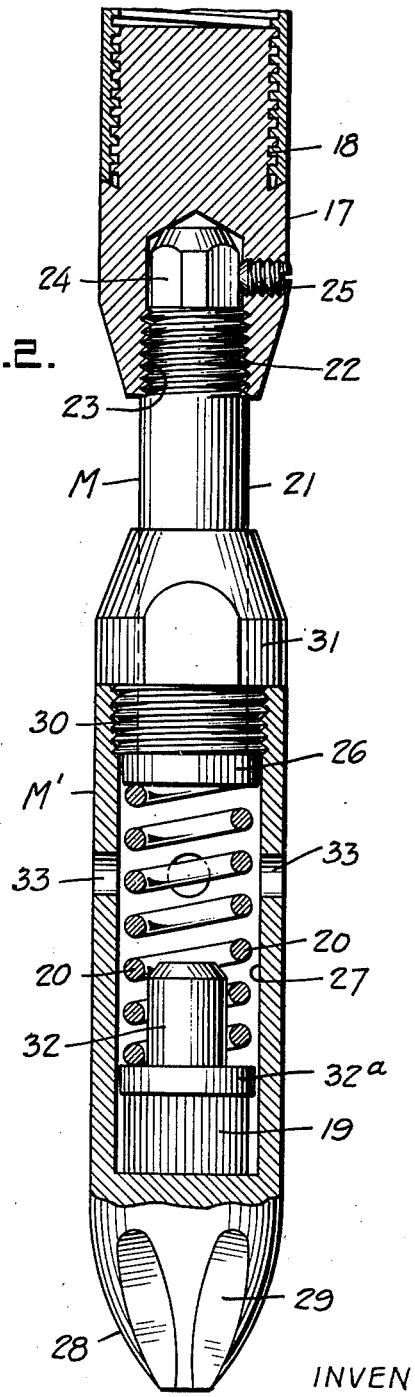
Fig. 2 is an enlarged fragmentary view showing the spear partly in section and connected to one sealing plug of the apparatus.

The fixed member M comprises a plunger having a stem or rod 21 threaded as at 22 into a socket 23 in the lower end of the plug 17. The rod end is retained in the socket against unscrewing by a non-circular pin 24 on the upper end of the rod which is engaged by a set-screw 25 threaded in the plug 17, as shown in Fig. 2. On the lower end of the rod is fixed a disk-shaped head 26, it being understood that both the rod and head are formed of metal.

The movable member M' comprises a metal body of tubular form for a major portion of its length to provide a cylinder 27 opening at the top of the body. Below the cylinder the spear body is shaped to provide a point 28 preferably formed with grooves 29.

The upper end of the cylinder 27 receives a collar 30 screw-threaded in the spear body and formed integral with a bushing 31. Through this bushing and collar the plunger rod 24 freely extends, while the plunger head 26 which exceeds the internal diameter of the collar, is adapted to abut the latter and is thus confined against displacement from the cylinder. This structural arrangement permits the spear body to telescope on the plunger with the latter moving axially within the cylinder.

The metallic member 20 is in the form of an expansible coiled spring positioned in the cylinder 27 so that its upper end abuts the head 26, while its lower end abuts a disk 32ª formed integral with a pilot stem 32 which extends upwardly into the spring and coacts with the disk to center the spring in the cylinder and thus insure free expansion and contraction thereof.

Situated beneath the disk 31 so as to be interposed between the latter and the blind end of the cylinder is the non-metallic member 19. It is desirable that this member be not only non-metallic but also it should possess a cushioning property in order that it will yield during compression of the spring and yet prevent a metal-to-metal contact between the disk and the blind end of the cylinder particularly when the spring is fully compressed. The material that I employ for the member 19 is semi-hard rubber. As the stem 32 is fixed centrally to the disk 32ᵃ uniform contact of the spring against the rubber member 19 is maintained to uniformally compress the rubber.

For the purpose of allowing free displacement of water, oil and mud from the cylinder during axial movement of the plunger and spear body relatively so that the spring will operate to effectively resist such movement, ports 33 are formed in the spear body. In the present instance four such ports are provided and spaced equidistantly circumferentially of the cylinder and in the same transverse plane. The precise location of the ports along the length of the cylinder is such that the plunger can move downwardly in the cylinder a distance sufficient to displace the liquid from the cylinder before the plunger head closes the ports. In this manner the possibility is prevented of liquid being trapped beneath the piston to preclude proper functioning of the spring.

In practice, the apparatus with the spear attached to the lower end of the housing is dropped or lowered into a drill pipe. As it descends the pipe the spear point strikes the tool joints successively and finally impinges against the drill bit stem on the lower end of the pipe. As the spear point strikes each tool joint the spring is compressed momentarily to resist upward movement of the spear body on the plunger and in a manner to absorb the resultant shock in its transmission to the housing and plugs 16 and 17. Thus no distortion of the housing and plugs can occur so that the sealing function of the plugs is fully preserved to maintain a fluid tight joint at both ends of the housing.

In the event of the spear being struck with a force sufficient to completely compress the spring such as when striking the drill bit stem in dropping of the apparatus into the drill pipe, the rubber block now yields to aid the spring in absorbing the shock, but primarily it prevents a metal-to-metal contact between the spring and the blind end of the cylinder so that the resultant shock is not transmitted to the plugs and housing. With the spring fully compressed its convolutions contact one with the other to form in effect a solid metal body which, if permitted to strike the blind end of the cylinder would transmit to the plugs and housing the entire resultant shock and thus destroy the seals at the ends of the housing.

Although I have herein shown and described only one form of shock dissipating spear embodying my invention, it is to be understood that various changes and modifications may be made herein without departing from the spirit of my invention and the spirit and scope of the appended claims.

I claim:

1. A shock dissipating spear for drift recording apparatus, comprising; a rigid body having a cylinder opening to only one end of the body; a plunger movable in and projecting from the cylinder; a coiled spring in the cylinder abutting the plunger head; and a non-metallic cushion between the spring and the closed end of the cylinder.

2. A shock dissipating spear for drift recording apparatus, comprising; a rigid body having a cylinder opening to only one end of the body; a plunger movable in and projecting from the cylinder; a coiled spring in the cylinder abutting the plunger head; a non-metallic cushion abutting the closed end of the cylinder; and a device between the spring and said cushion for centering the spring in the cylinder where it bears against said cushion.

3. A shock dissipating spear for drift recording apparatus, comprising; a rigid body having a cylinder opening to only one end of the body; a plunger movable in and projecting from the cylinder; a coiled spring in the cylinder abutting the plunger head; a non-metallic cushion abutting the closed end of the cylinder; and a device between the spring and said cushion comprising a stem extending into the spring, and a disk fixed to the stem and bearing on said cushion.

4. A shock dissipating spear for drift recording instrument, comprising; a rigid body having a cylinder opening to one end only of the body; a collar secured in the open end of the cylinder; a plunger having a stem extending outwardly through the collar and a head in the cylinder adapted to abut the inner side of the collar; a coiled spring in the cylinder abutting the plunger head; a rubber cushion abutting the closed end of the cylinder; and a device having a stem extending in the spring between the latter and said cushion, and a disk abutting said cushion.

5. A shock dissipating spear for drift recording apparatus; comprising a cylinder closed at one end only; a plunger movable in and projecting from the open end of the cylinder; a spring in the cylinder between the plunger and the closed end of the cylinder; a non-metallic cushion between the spring and the closed end of the cylinder; and ports in the cylinder so situated as to allow fluid to be displaced from the cylinder upon movement of the plunger inwardly of the cylinder.

6. In a drift recording apparatus; a housing; a plug closing the lower end of the housing; and a spear having a fixed member secured to the plug and a movable member telescopically receiving the fixed member, and resilient means within the movable member for yieldingly resisting movement of the movable member upwardly on the fixed member comprising a spring and a non-metallic cushioning member correlated to the spring so as to prevent one end of the spring engaging one of the members.

7. A shock dissipating spear for well drift recording apparatus, comprising; a cylinder; a plunger telescoping in the cylinder; resilient metallic means for yieldingly resisting movement of the plunger inwardly of the cylinder; and non-metallic cushioning means for yieldingly resisting movement of the plunger inwardly of the cylinder.

8. A shock dissipating spear for well drift recording apparatus, comprising; a cylinder; a plunger telescoping in the cylinder; resilient metallic means for yieldingly resisting movement of the plunger inwardly of the cylinder; and non-metallic cushioning means in the cylinder for yieldingly resisting movement of the plunger inwardly of the cylinder after full compression of said resilient metallic means.

JOE W. CULBERTSON.